United States Patent [19]

Grosshandler

[11] 4,303,518

[45] Dec. 1, 1981

[54] LOW PRESSURE HIGH VOLUME FILTER APPARATUS

[75] Inventor: Sandor Grosshandler, Middleburg Heights, Ohio

[73] Assignee: The Dow Chemical Company, Midland, Mich.

[21] Appl. No.: 854,931

[22] Filed: Nov. 25, 1977

[51] Int. Cl.³ .................... B01D 27/00; B01D 29/32
[52] U.S. Cl. .................... 210/236; 210/238; 210/323.1; 210/346; 210/453
[58] Field of Search .............. 210/236, 333, 340, 341, 210/346, 347, 232, 234, 237, 238, 244, 450, 453

[56] References Cited

U.S. PATENT DOCUMENTS

| | | | |
|---|---|---|---|
| 350,181 | 10/1886 | Ackerson | 210/238 |
| 727,230 | 5/1903 | Underwood | 210/346 X |
| 945,763 | 1/1910 | Disbrow | 210/238 |
| 1,401,199 | 12/1921 | Simpson et al. | 210/346 X |
| 1,564,351 | 12/1925 | Hoehn | 210/341 |
| 1,696,735 | 12/1928 | Scoville | 210/323.1 |
| 1,746,336 | 2/1930 | Breer | 210/234 |
| 1,782,702 | 11/1930 | Wheeler | 210/234 |
| 2,024,426 | 12/1935 | Butler | 210/331 |
| 3,064,818 | 11/1962 | Kasten | 210/238 |
| 3,074,561 | 1/1963 | Mummert | 210/333 |
| 3,358,843 | 12/1967 | Bourdale | 210/487 |
| 3,399,776 | 9/1968 | Knuth | 210/234 |
| 3,493,115 | 2/1970 | Koches | 210/238 |

Primary Examiner—Robert H. Spitzer
Attorney, Agent, or Firm—R. B. Ingraham

[57] ABSTRACT

Rectangular filter cartridges are locked into a filter by means of a cam. Cartridges are readily replaceable.

5 Claims, 3 Drawing Figures

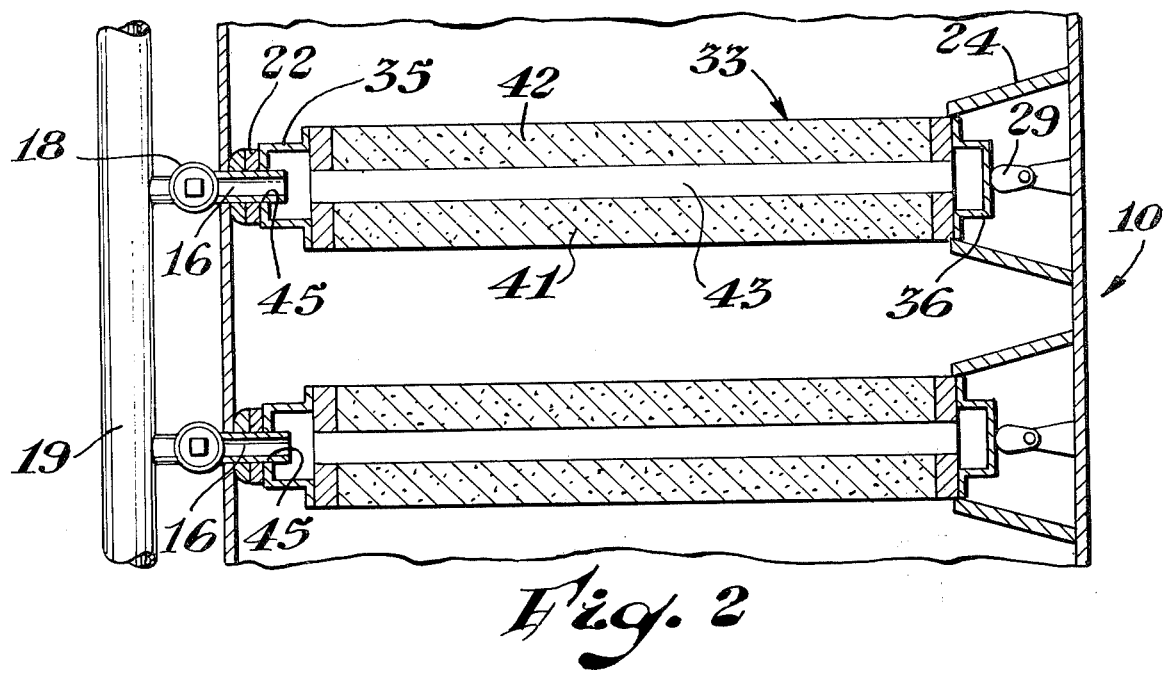
Fig. 2
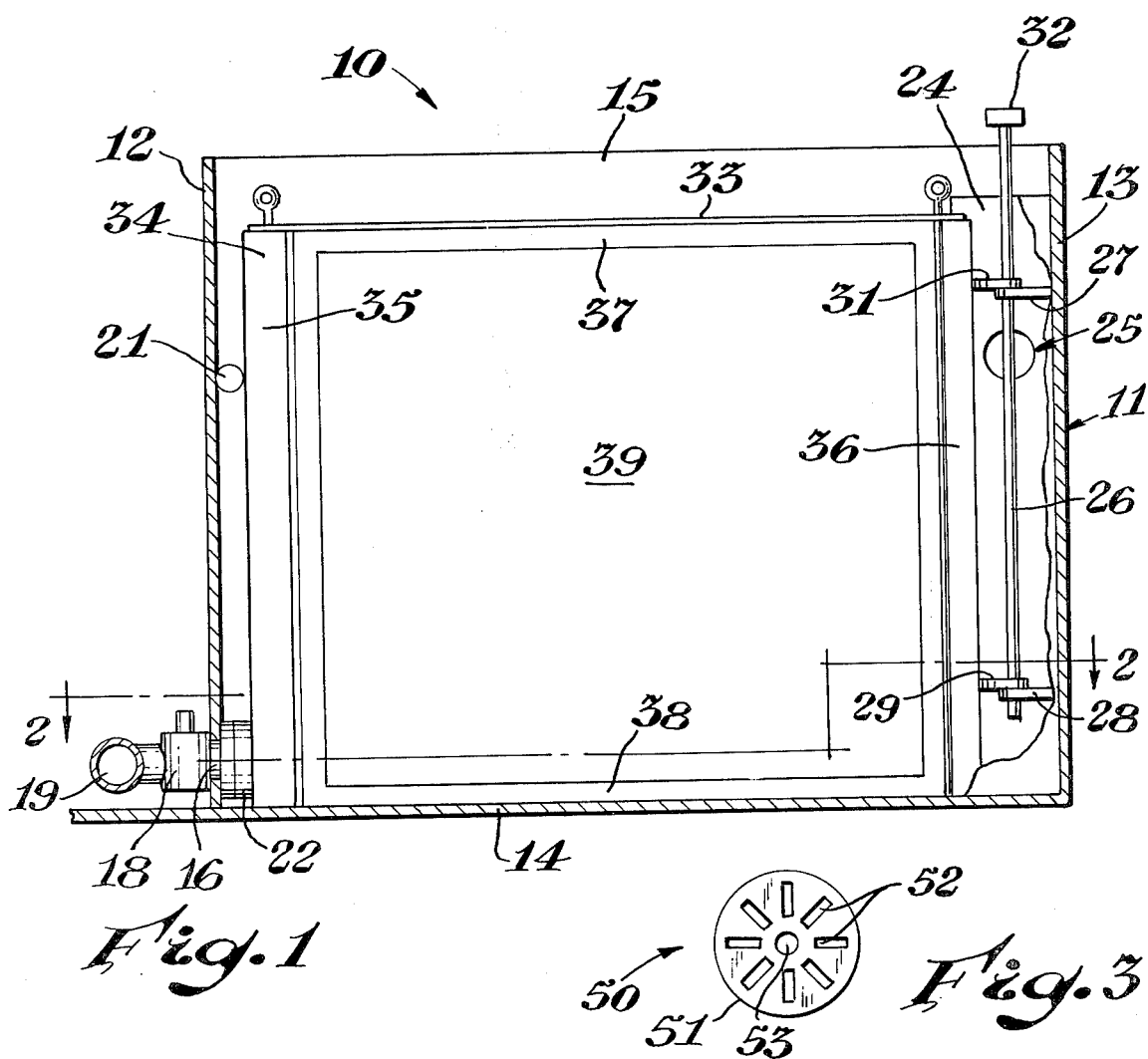
Fig. 1
Fig. 3

LOW PRESSURE HIGH VOLUME FILTER APPARATUS

Oftentimes, it is desirable to have available low pressure drop relatively high volume capacity filters, for example, as a polishing filter for industrial wastes such as might be encountered in steel mills, refineries, chemical plants, and the like. Such filters are generally required to handle relatively large volumes of waste water at low pressure drops. Oftentimes, it is desirable to have available a filter which permits continuous flow of the waste water while permitting change or replacement of the filter element. In many filters, such filter element change is not readily accomplished.

It would be desirable if there were available an improved high volume low pressure drop filter.

It would be desirable if there were available an improved high volume low pressure filter in which the filter elements could be changed without significantly disrupting flow through the filter.

It would also be desirable if there were available such an improved filter wherein the filter element could be changed quickly with minimal labor.

These benefits and other advantages in accordance with the present invention are achieved in a high volume low pressure drop filter assembly, the filter assembly comprising a container having a bottom and at least one side wall, the container having a plurality of spaced-apart guide means and a plurality of open-ended first conduits with the first conduits disposed adjacent the bottom of the container and extending generally parallel thereto, the terminal end of each of the first conduits being in generally fixed spaced relationship from one of the guide means, disposed within the guide means at least one cam which on rotation moves toward or away from the first conduit associated with the guide means, a plurality of generally rectangular filter plates, the filter plates comprising a generally hollow rectangular frame defining a generally rectangular passageway from one side of the frame to the other side of the frame, a first filter element adjacent a first side of the frame, a second filter element adjacent the second side of the frame, the first and second filter elements being generally spaced apart from each other and maintained in fixed relationship in the hollow rectangular frame, a conduit receiving passage defined in one edge of the frame and having liquid-tight sealing means associated therewith, said frame being of sufficient size to extend between a conduit and its associated guide means, the guide means adapted to receive one edge of the rectangular frame, maintaining the frame in a generally vertical position, the edge supported by the guide means engaging the cam and the guide means maintaining the filter elements in a generally fixed position within the container and a second conduit communicating with space exterior to the filter plates within the container.

Further features and advantages of the present invention will become more apparent from the following specification taken in connection with the drawing wherein:

FIG. 1 depicts a sectional end view of a filter in accordance with the invention;

FIG. 2 is a fractional sectional view through the filter of FIG. 1 along the line 2—2; and FIG. 3 is a schematic representation of a filter in accordance with the invention installed in a circular tank.

In FIG. 1 there is schematically depicted a sectional view of a filter in accordance with the present invention generally designated by the reference numeral 10. The filter 10 comprises in cooperative combination a generally rectangular container 11 having a first side wall 12, a second side wall 13, a bottom 14, a first end 15 and a second end (not shown). A plurality of conduits 16 pass through the first side 12. Each of the conduits 16 is provided with a valve 18 externally disposed to the wall 12. The valve means 18 is in operative communication with a header or supply or discharge conduit 19. A discharge or supply conduit 21 terminates at the end wall 15 of the container 11. A sealing means or resilient gasket 22 is disposed over the conduit 16 within the container 11 and adjacent the wall 12. A filter plate guide means 24 is affixed to the wall 13 and generally oppositely disposed from the end of the associated conduit 16. Immediately adjacent to and contained generally within the guide means 24 is a cam or locking assembly 25. The assembly 25 comprises a rotatable shaft 26 rotatably supported in bearings 27 and 28 affixed to the wall 13 of the container 11. The shaft 26 carriers a first or lower cam 29 and a second or upper cam 31. An operating handle or wrench engaging means 32 is disposed on the shaft 26 remote from the container bottom 13. A plurality of generally rectangular filter plates 33 (one shown) is disposed within the container 11. The filter plate 33 has a generally rectangular rigid frame 34 having a first side 35, a second side 36, a top 37 and a bottom 38. The filter plate 33 is in communication with the conduit 16 by means of an opening in the first side 35 of the filter plate and the opening is positioned generally adjacent the bottom 13 of the container 11. Cams 29 and 31 engage the second side 36 of the plate 33 and force the plate 33 toward the first side 12 of the container 11.

In FIG. 2 there is shown a fractional sectional view of the filter 10 taken along the line 2—2 of FIG. 1. In FIG. 2 there is shown the filter plate 33 which has first and second generally planar filter elements 41 and 42, respectively. The filter elements 41 and 42 are affixed within the rectangular frame 33 and permit liquid flow therethrough. The filter elements 41 and 42 define therebetween a space 43. The space 43 is in full communication with a terminal end of the conduit 16 which passes through an opening 45 defined in the first side 35 of the plate 33. The sealing means or gasketing 22 provides for a liquid-tight connection between the side 35 of the plate 33 and the conduit 16. For convenience of operation, a plurality of like filter assemblies are disposed in generally parallel relationship in the embodiment 10 of FIGS. 1 and 2 of the present invention.

In operation of a filter in accordance with the present invention, the filter plates are installed within the container by positioning the second edge of the filter plates within the guide means 24, while the cams 29 are rotated so that they are positioned remote from the conduit 16. The first edge 35 of the filter plate 33 is then positioned so that the opening 45 is adjacent the terminal portion of conduit 15. The shaft 25 is rotated forcing the side 35 over the conduit 16 and into engagement with the seal or gasket 32. The valve 18 may then be opened. When a sufficient number of filter plates have been installed to handle the desired flow capacity, flow of liquid through the filter may be initiated. Depending upon the type of operation, flow may be from the header 19 through the valve 18 into the space 43, through the filter elements 41 and 42 and out of the conduit 21. Solids are then retained within the space 43.

If it is desired to observe the solid build-up on the exterior of the filter elements, flow may be reversed, that is, the conduit 21 be employed as the inlet and the discharge being through conduit 16 into the header 19. Generally, if the solids in the liquid stream are relatively large in size, the latter flow is more desirable in that one may readily observe the solids accumulation and cleaning sometimes may be accomplished by backwashing and/or the stream of a hose applied to the visible surface of the filter element. As the filter continues in service, the individual filter plates may be readily changed by closing valve 18 associated with the plate or plates to be changed, rotating the shaft 26, moving the plate out of engagement with conduit 16, removing the plate and replacing the plate in the hereinbefore described manner.

In FIG. 3 there is depicted a schematic top view of a filter in accordance with the present invention generally designated by the reference numeral 50. The filter 50 has a cylindrical vertical tank 51 having disposed therein a plurality of radially disposed filter plates 52 supported and connected in the manner depicted in FIGS. 1 and 2. A header 53 is axially disposed within the cylindrical tank 51 and has affixed thereto conduits and valve equivalent to conduit 16 and valve 18 of FIGS. 1 and 2. Filters in accordance with the present invention are readily prepared, maintained and serviced with minimal effort.

Filters in accordance with the present invention are readily fabricated from materials generally employed for the manufacture of filters. Such materials include wood, metals such as carbon steel, stainless steel and the like, as well as various so-called plastic materials which include both thermoplastic and thermosetting resins. This selection of the particular material or materials employed is well within the skill of a person familiar with the fabrication of filters. Such filters are readily assembled by welding, bolting, gluing and like well known methods of assembly. The porous or permeable filter elements may be of any porous material suitable for the particular end-use application.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A high volume low pressure drop filter assembly, the filter assembly comprising a container having a bottom and at least one side wall, the container having a plurality of spaced-apart guide means and a plurality of open-ended first conduits with the first conduits disposed adjacent the bottom of the container and extending generally parallel thereto, the terminal end of each of the first conduits being in generally fixed spaced relationship from one of the guide means, disposed within the guide means at least one cam which on rotation moves toward or away from the first conduit associated with the guide means, a plurality of generally rectangular filter plates, the filter plates comprising a generally hollow rectangular frame defining a generally rectangular passageway from one side of the frame to the other side of the frame, a first filter element adjacent a first side of the frame, a second filter element adjacent the second side of the frame, the first and second filter elements being generally spaced apart from each other and maintained in fixed relationship in the hollow rectangular frame, a conduit receiving passage defined in one edge of the frame and having liquid-tight sealing means associated therewith, said frame being of sufficient size to extend between a conduit and its associated guide means, the guide means adapted to receive an edge of the rectangular frame remote from the conduit receiving passage, maintaining the frame in a generally vertical position, the edge supported by the guide means and remote from the conduit receiving passage engaging the cam and the guide means maintaining the filter elements in a generally fixed position within the container and a second conduit communicating with space exterior to the filter plates within the container.

2. The filter assembly of claim 1 wherein the filter plates are generally parallel and the container is rectangular.

3. The filter assembly of claim 1 wherein the filter plates are generally radially disposed in a circular container.

4. The filter assembly of claim 1 wherein the filter plates comprise a hollow rectangular frame supporting two spaced apart generally planar filter elements.

5. The filter assembly of claim 1 wherein the first conduits have associated therewith a valve means.

* * * * *